US009006302B2

(12) United States Patent
Amos et al.

(10) Patent No.: US 9,006,302 B2
(45) Date of Patent: Apr. 14, 2015

(54) GLASS BUBBLES, COMPOSITES THEREFROM, AND METHOD OF MAKING GLASS BUBBLES

(75) Inventors: Stephen E. Amos, Minneapolis, MN (US); Robert W. Hunter, Burnsville, MN (US); Ronald J. Israelson, Lake Elmo, MN (US); Towako Takeishi, Kawaksakai (JP); Mark J. Williams, Cottage Grove, MN (US); Takujiro Yamabe, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/821,167

(22) PCT Filed: Sep. 7, 2011

(86) PCT No.: PCT/US2011/050648
§ 371 (c)(1),
(2), (4) Date: Mar. 6, 2013

(87) PCT Pub. No.: WO2012/033810
PCT Pub. Date: Mar. 15, 2012

(65) Prior Publication Data
US 2013/0165542 A1 Jun. 27, 2013

Related U.S. Application Data

(60) Provisional application No. 61/380,770, filed on Sep. 8, 2010.

(51) Int. Cl.
*C08K 7/28* (2006.01)
(52) U.S. Cl.
CPC ............. *C08K 7/28* (2013.01); *C08K 2201/005* (2013.01)
(58) Field of Classification Search
CPC ...................................................... C03C 11/002
See application file for complete search history.

(56) References Cited

U.S. PATENT DOCUMENTS

| 2,676,892 | A | | 4/1954 | McLaughlin |
| 2,797,201 | A | | 6/1957 | Veatch |
| 2,978,340 | A | | 4/1961 | Veatch |
| 3,030,215 | A | | 4/1962 | Veatch |
| 3,129,086 | A | | 4/1964 | Veatch |
| 3,230,064 | A | | 1/1966 | Veatch |
| 3,365,315 | A | | 1/1968 | Beck |
| 3,796,126 | A | | 3/1974 | Turner |
| 3,961,978 | A | | 6/1976 | Brodmann |
| 4,017,290 | A | | 4/1977 | Budrick |
| 4,243,575 | A | | 1/1981 | Myers |
| 4,391,646 | A | * | 7/1983 | Howell ........................ 523/219 |
| 4,522,958 | A | * | 6/1985 | Das et al. ...................... 523/212 |
| 4,661,137 | A | | 4/1987 | Garnier |
| 4,692,480 | A | | 9/1987 | Takahashi et al. |
| 4,736,527 | A | | 4/1988 | Iwamoto |
| 4,767,726 | A | * | 8/1988 | Marshall ........................ 501/33 |
| 4,904,709 | A | | 2/1990 | Hermele |
| 4,923,520 | A | | 5/1990 | Anzai |
| 4,983,550 | A | | 1/1991 | Goetz |
| 5,019,605 | A | | 5/1991 | Jannic |
| 5,064,784 | A | | 11/1991 | Saito |
| 5,217,928 | A | | 6/1993 | Goetz |
| 5,246,983 | A | | 9/1993 | Shibata |
| 5,384,345 | A | | 1/1995 | Naton |
| 5,407,983 | A | | 4/1995 | Naton |
| 5,500,287 | A | | 3/1996 | Henderson |
| 5,597,522 | A | | 1/1997 | Curzon et al. |
| 5,695,851 | A | | 12/1997 | Watanabe |
| 6,387,447 | B1 | | 5/2002 | Grimm |
| 6,464,770 | B1 | | 10/2002 | Palm |
| 6,531,222 | B1 | | 3/2003 | Tanaka |
| 6,906,009 | B2 | | 6/2005 | Shinbach |
| 6,951,577 | B2 | | 10/2005 | Carter |
| 7,365,144 | B2 | | 4/2008 | Ka |
| 7,406,990 | B2 | | 8/2008 | Brown |
| 7,449,503 | B2 | | 11/2008 | Senturk |
| 8,034,852 | B2 | | 10/2011 | Janssen |
| 2002/0004111 | A1 | * | 1/2002 | Matsubara et al. .......... 428/34.4 |
| 2002/0137872 | A1 | | 9/2002 | Schneider |
| 2005/0238864 | A1 | | 10/2005 | D'Souza |

(Continued)

FOREIGN PATENT DOCUMENTS

EP 0449604 10/1991
EP 0 549 827 7/1993
(Continued)

OTHER PUBLICATIONS

"3M microspheres selection guide" by 3M. Apr. 2010.*
"3M glass bubbles iM16K" by 3M. 2013.*
"3M™ Microspheres Selection Guide", 3M Center. Energy and Advanced Materials Di vison, Apr. 2010.
Arkles, "Silane Coupling Agents: Connecting Across Boundaries", 2006, 60 pages.
Krenske, "Elastic Buckling Strength of Spherical Glass Shells", David Taylor Model Basin Report No. 1759, Sep. 1963, 21 pages.
Malvern, "Image Analysis Application Note", 4 pages.
(Continued)

*Primary Examiner* — Randy Gulakowski
*Assistant Examiner* — Christina Wales

(57) ABSTRACT

The present disclosure provides a plurality of glass bubbles having an average true density of up to about 0.55 grams per cubic centimeter and a size distribution including a median size in a range from about 15 micrometers to 40 micrometers. A hydrostatic pressure at which ten percent by volume of the plurality of glass bubbles collapses is at least about 100 megapascals. In some embodiments, the plurality of glass bubbles is a graded fraction preparable by classifying a second plurality of glass bubbles, wherein the second plurality of glass bubbles has a higher percentage of glass bubbles with a size of up to ten micrometers than the first plurality of glass bubbles. Composites including the plurality of glass bubbles are also disclosed.

20 Claims, No Drawings

(56) References Cited

U.S. PATENT DOCUMENTS

| | | |
|---|---|---|
| 2005/0282001 A1 | 12/2005 | Jenkines |
| 2006/0105053 A1 | 5/2006 | Marx |
| 2006/0122049 A1* | 6/2006 | Marshall et al. ............... 501/27 |
| 2006/0243363 A1* | 11/2006 | Hunter et al. ............ 149/109.2 |
| 2007/0104943 A1 | 5/2007 | D'Souza |
| 2007/0116942 A1 | 5/2007 | D'Souza |
| 2007/0155858 A1 | 7/2007 | Israelson |
| 2010/0324171 A1* | 12/2010 | Maljkovic et al. ............ 523/219 |

FOREIGN PATENT DOCUMENTS

| | | |
|---|---|---|
| EP | 1 142 685 | 10/2001 |
| FR | 2 671 072 | 7/1992 |
| JP | 3-79644 | 4/1991 |
| JP | 4-268340 | 9/1992 |
| JP | 4-296349 | 10/1992 |
| JP | 2001-121084 | 5/2001 |
| JP | 2002-338280 | 11/2002 |
| JP | 3510346 | 3/2004 |
| WO | WO 2006-118901 | 11/2006 |
| WO | WO 2008-090235 | 7/2008 |
| WO | WO 2008090235 A2 * | 7/2008 |

OTHER PUBLICATIONS

Malvern, "Zetasizer Nano Technical Note", 2009, 3 pages.
International Search Report for PCT International Application No. PCT/US2011/050648, Mailed Nov. 8, 2011, 3 pages.

* cited by examiner

GLASS BUBBLES, COMPOSITES THEREFROM, AND METHOD OF MAKING GLASS BUBBLES

CROSS REFERENCE TO RELATED APPLICATIONS

This application is a national stage filing under 35 U.S.C. 371 of PCT/US2011/050648, filed Sep. 7, 2011, which claims priority to U.S. Application No. 61/380,770, filed Sep. 8, 2010, the disclosure of which is incorporated by reference in its entirety herein.

BACKGROUND

Glass bubbles having an average diameter of less than about 500 micrometers, also commonly known as "glass microbubbles", "hollow glass microspheres", or "hollow glass beads" are widely used in industry, for example, as additives to polymeric compounds. In many industries, glass bubbles are useful, for example, for lowering weight and improving processing, dimensional stability, and flow properties of a polymeric compound. Generally, it is desirable that the glass bubbles be strong to avoid being crushed or broken during processing of the polymeric compound, such as by high pressure spraying, kneading, extrusion, pultrusion, sintering, or molding (e.g., compression molding, injection molding, blow molding, roto-molding, thermoforming, and injection-compression molding).

Some processes have been described for achieving high strength glass bubbles. However, at least due to their great utility, new high strength glass bubbles continue to be desirable.

SUMMARY

The present disclosure provides glass bubbles with unexpectedly high strength for their density and size. For example, the plurality of glass bubbles according to the present disclosure has a higher strength than typically would be expected for its density. Similarly, the plurality of glass bubbles according to the present disclosure has a lower density than typically would be expected given its strength. Since the lowest density glass bubble that can survive in a particular application is typically selected for use in that application, the glass bubbles disclosed herein are useful, for example, for providing cost-effective, relatively low-density glass-bubble-filled polymer composites while maintaining the polymer physical properties. The plurality of particles according to the present disclosure can be prepared, for example, using a counterintuitive classifying method that removes the smallest, typically strongest bubbles from a distribution of glass bubbles.

In one aspect, the present disclosure provides a first plurality of glass bubbles having an average true density of up to about 0.55 grams per cubic centimeter and a size distribution comprising a median size by volume in a range from about 15 micrometers to about 40 micrometers, wherein a hydrostatic pressure at which ten percent by volume of the first plurality of glass bubbles collapses is at least about 100 megapascals. In some embodiments, the first plurality of glass bubbles is a graded fraction preparable by classifying a second plurality of glass bubbles, wherein the second plurality of glass bubbles has a higher number of glass bubbles with a size of up to ten micrometers than the first plurality of glass bubbles. In some embodiments, the size distribution further comprises up to forty percent by number of the glass bubbles having a size of up to ten micrometers. In some embodiments, the size distribution further comprises up to twenty percent by number of the glass bubbles having a size of up to ten micrometers.

In another aspect, the present disclosure provides a method of making a graded fraction of glass bubbles, the method comprising:
  providing a second plurality of glass bubbles having a second size distribution comprising a median size, a number of glass bubbles up to ten micrometers in size, and a number of glass bubbles larger at least 40 micrometers in size;
  removing at least a portion of the glass bubbles at least 40 micrometers in size;
  removing at least a portion of the glass bubbles up to ten micrometers in size,
  wherein after removing at least a portion of the glass bubbles at least 40 micrometers in size and removing at least a portion of the glass bubbles up to ten micrometers in size, a first plurality of glass bubbles remains as the graded fraction of glass bubbles, wherein the first plurality of glass bubbles has a number of glass bubbles up to ten micrometers in size that is lower than the number of glass bubbles up to ten micrometers in size of the second plurality of glass bubbles, and wherein one of the following conditions is met:
    the first plurality of glass bubbles and the second plurality of glass bubbles have equivalent densities, but the first plurality of glass bubbles is higher in strength than the second plurality of glass bubbles;
    the first plurality of glass bubbles and the second plurality of glass bubbles have equivalent strengths, but the first plurality of glass bubbles is lower in density than the second plurality of glass bubbles; or
    the first plurality of glass bubbles is both lower in density and higher in strength than the second plurality of glass bubbles.

In another aspect, the present disclosure provides a composite comprising a polymer and a first plurality of glass bubbles according to and/or prepared according to the foregoing aspects.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The terms "first" and "second" are used in this disclosure merely as a matter of convenience in the description of one or more of the embodiments. It will be understood that, unless otherwise noted, those terms are used in their relative sense only.

The term "plurality" refers to more than one. In some embodiments, the first plurality of glass bubbles disclosed herein comprises at least 2, 10, 100, or 1000 of such bubbles.

The term "average true density" is the quotient obtained by dividing the mass of a sample of glass bubbles by the true volume of that mass of glass bubbles as measured by a gas pycnometer. The "true volume" is the aggregate total volume of the glass bubbles, not the bulk volume.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

The present disclosure provides a first plurality of glass bubbles having an average true density of up to about 0.55 grams per cubic centimeter and a size distribution comprising a median size by volume in a range from about 15 micrometers to about 40 micrometers, wherein a hydrostatic pressure at which ten percent by volume of the first plurality of glass bubbles collapses is at least about 100 megapascals. The first plurality of glass bubbles is generally not to be considered a portion of glass bubbles with bulk properties outside of these ranges. In some embodiments, the first plurality of glass bubbles consists essentially of a plurality of glass bubbles having an average true density of up to about 0.55 grams per cubic centimeter and a size distribution comprising a median size by volume in a range from about 15 micrometers to about 40 micrometers, wherein a hydrostatic pressure at which ten percent by volume of the first plurality of glass bubbles collapses is at least about 100 megapascals. "Consists essentially of" can mean, for example, the first plurality of glass bubbles does not contain other bubbles that change its average true density, median size, or collapse strength from the indicated values by more than about one percent, one percent, and five percent, respectively.

The first plurality of glass bubbles according to the present disclosure has an average true density of up to about 0.55 grams per cubic centimeter (g/cc). "About 0.55 g/cc" means 0.55 g/cc±one percent. In some of these embodiments, the average true density is up to 0.54, 0.53, 0.52, 0.51, 0.50, 0.49, 0.48, 0.47, 0.46, 0.45, 0.44, 0.43, 0.42, 0.40, or 0.40 g/cc. The average true density of the first plurality of glass bubbles disclosed herein is generally at least 0.30, 0.35, or 0.38 g/cc. For example, the average true density of the first plurality of glass bubbles disclosed herein may be in a range from 0.30 g/cc to 0.55 g/cc, 0.35 g/cc to 0.55 g/cc, 0.38 g/cc to 0.55 g/cc, 0.30 g/cc to 0.50 g/cc, 0.35 g/cc to 0.50 g/cc, 0.38 g/cc to 0.50 g/cc, 0.30 g/cc to 0.45 g/cc, 0.35 g/cc to 0.45 g/cc, or 0.38 g/cc to 0.45 g/cc. For the purposes of this disclosure, average true density is measured using a pycnometer according to ASTM D2840-69, "Average True Particle Density of Hollow Microspheres". The pycnometer may be obtained, for example, under the trade designation "Accupyc 1330 Pycnometer" from Micromeritics, Norcross, Ga. Average true density can typically be measured with an accuracy of 0.001 g/cc. Accordingly, each of the density values provided above can be ±one percent.

The first plurality of glass bubbles according to the present disclosure has a size distribution comprising a median size by volume in a range from about 15 micrometers to about 40 micrometers. In the measurement of size "about" a given size can include a value±one percent. The median size by volume of the glass bubbles may be, for example, in a range from 15 to 35 micrometers (in some embodiments from 16 to 40 micrometers, 16 to 30 micrometers, 16 to 25 micrometers, 15 to 30 micrometers, from 15 to 25 micrometers, or even from 20 to 35 micrometers). The median size is also called the D50 size, where 50 percent by volume of the glass bubbles in the distribution are smaller than the indicated size. In some embodiments, up to 45, 40, 35, 30, 25, 20, 15, 10, or 5 percent by number of the first plurality of glass bubbles have a size up to ten (in some embodiments, up to 11, 12, 13, 14, or 15) micrometers. In some embodiments, the first plurality of glass bubbles disclosed herein has a size distributed from 20 to 45, 20 to 38, or 20 to 32 micrometers. As used herein, the term size is considered to be equivalent with the diameter and height of the glass bubbles. For the purposes of the present disclosure, the median size by volume is determined by laser light diffraction by dispersing the glass bubbles in deaerated deionized water. Laser light diffraction particle size analyzers are available, for example, under the trade designation "SATURN DIGISIZER" from Micromeritics. For the purposes of the present disclosure, the percentage of glass bubbles by number is determined by image analysis using a scanning electron microscope according to the test method described in the Examples, below.

The size distribution of the first plurality of glass bubbles and/or second plurality of glass bubbles may be Gaussian, normal, or non-normal. Non-normal distributions may be unimodal or multi-modal (e.g., bimodal).

For the first plurality of glass bubbles according to the present disclosure, a hydrostatic pressure at which ten percent by volume of the first plurality of glass bubbles collapses is at least about 100 (in some embodiments, at least about 110, 120, 130 or 140) Megapascals (MPa). "About 100 MPa" means 100 MPa±five percent. In some embodiments, a hydrostatic pressure at which twenty percent by volume of the first plurality of glass bubbles collapses is at least 100, 110, or 120 MPa. In some embodiments, a hydrostatic pressure at which ten percent, or twenty percent, by volume of the first plurality of glass bubbles collapses is up to 210 (in some embodiments, up to 190, 170, or 160) MPa. The hydrostatic pressure at which ten percent by volume of the first plurality of glass bubbles collapses may be in a range from 100 to 210 MPa, 100 to 190 MPa, 110 to 210 MPa, or 110 to 190 MPa. The hydrostatic pressure at which twenty percent by volume of the first plurality of glass bubbles collapses may be in a range from 100 to 210 MPa, 110 to 210 MPa, 110 to 170 MPa, or 110 to 190 MPa. For the purposes of the present disclosure, the collapse strength of the glass bubbles is measured on a dispersion of the glass bubbles in glycerol using ASTM D3102-72 "Hydrostatic Collapse Strength of Hollow Glass Microspheres"; with the exception that the sample size (in grams) is equal to 10 times the density of the glass bubbles. Further details are provided in the Examples, below. Collapse strength can typically be measured with an accuracy of ±about five percent. Accordingly, each of the collapse strength values provided above can be ±five percent.

The first plurality of glass bubbles according to the present disclosure is typically prepared by classifying a second plurality of glass bubbles, wherein the second plurality of glass bubbles has a higher number of glass bubbles with a size of up to ten micrometers than the first plurality of glass bubbles. In other words, the classifying of the second plurality of glass bubbles typically involves removing at least some small bubbles to decrease the number of bubbles with a size less than a selected threshold (e.g., 15, 14, 13, 12, 11, or 10 micrometers). In some of these embodiments, the second plurality of glass bubbles further has a larger number of glass bubbles at least 40 micrometers in size than the first plurality of glass bubbles, and the classifying further involves removing glass bubbles at least 40 micrometers in size from the second plurality of glass bubbles.

It is unexpected that a plurality of glass bubbles having an average true density up to 0.55 g/cc and a median size by volume of in a range from 15 to 40 micrometers would have a crush strength wherein a hydrostatic pressure at which ten percent by volume of the plurality of glass bubbles collapses is at least 100 Megapascals. Furthermore, it is unexpected that a first plurality of glass bubbles according to the present disclosure can be obtained, in some embodiments, by classifying a second plurality of glass bubbles, wherein the second plurality of glass bubbles has a higher percentage of glass bubbles with a size of up to ten micrometers than the first plurality of glass bubbles.

Theoretically, the collapse strength of an individual glass bubble (or a monodisperse sample of glass bubbles) should be as given by a formula devised by M. A. Krenzke and R. M. Charles ("Elastic Buckling Strength of Spherical Glass Shells," David Taylor Model Basin Report No. 1759, September, 1963), $$\text{Theoretical Collapse Strength} = \frac{0.8E\,(h/r)^2}{\sqrt{1-V^2}}$$

where "E" is Young's modulus for the glass of the bubbles, "h" is the thickness of the wall of the bubbles, "r" is the radius of the bubble, and "V" is Poisson's ratio for the glass. The equation suggests that two factors, among others, that influence the approximate theoretical strength of a spherical glass bubble are wall thickness, which relates to density, and the average radius. Typically, with other factors being equal, theoretical collapse strength of glass bubbles is thought to increase with increasing density and decreasing size. However, size and density alone are not predictive of glass bubble collapse strength.

Certain art has suggested the desirability of smaller bubbles, for example, for high strength. See, e.g., U.S. Pat. No. 6,531,222 (Tanaka et al.) and U.S. Pat. Appl. Pub. No. 2007/0104943 (D'Souza et al.). Contrary to this suggestion, the plurality of particles according to the present disclosure have a relatively low percentage (e.g., up to 45, 40, 35, 30, 25, 20, 15, or 10 percent) with a relatively small size (up to 10, 11, 12, 13, 14, or 15 micrometers). In embodiments where the first plurality of glass bubbles is preparable by classifying a second plurality of glass bubbles, wherein the second plurality of glass bubbles has a higher number of glass bubbles with a size of up to ten micrometers than the first plurality of glass bubbles and, in some embodiments, a higher number of glass bubbles at least 40 micrometers in size than the first plurality of glass bubbles, any one of the following effects may generally be obtained. First, the density may remain the same while the collapse strength is increased. Secondly, the collapse strength may remain the same while the density is decreased, or thirdly, the collapse strength may be increased while the density is decreased. As shown in the Examples, below, when both large bubbles and small bubbles are removed from a distribution of glass bubbles, Glass Bubbles Example 1 have an improved strength to density ratio by moving the particle size distribution to a region that has lower density but strength equivalent to the original particle size distribution. On the other had Glass Bubbles Example 2 also have an improved strength to density ratio by moving the particle size distribution to a region that has higher strength but the same density as the original distribution. It is considered counterintuitive that removing a portion of the small bubbles from a second plurality of glass bubbles will maintain or even improve the strength when such small bubbles are considered to be the strongest in the distribution.

Furthermore, commercial, thermally formed glass bubbles are known to achieve an empirical maximum between 20 and 37 percent of the calculated theoretical strength because of defects in the wall of the bubbles, for example. For the purposes of the present discussion, 37 percent is taken as the best case empirical maximum. Surprisingly, the plurality of particles according to the present disclosure typically exceeds the best case empirical maximum without changing the composition or thermal forming process of the glass bubbles. For example, for a glass bubble with a density of 0.42 g/cc, 37% of the theoretical maximum strength is about 84 MPa. For a first plurality of glass bubbles according to the present disclosure, removing small and large glass bubbles from a second plurality of glass bubbles having a density of 0.42 g/cc and a measured collapse strength of 79 MPa provided a first plurality of glass bubbles having a density of 0.42 g/cc and a collapse strength greater than 100 MPa, exceeding the best case theoretical maximum (see Glass Bubble Example 2, below). Since the first plurality of glass bubbles was a fraction of the second plurality of glass bubbles, the composition and process for forming the glass bubbles was necessarily the same.

Glass bubbles according to and/or useful for practicing the present disclosure can be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U.S. Pat. App. Pub. No. 2006/0122049 (Marshall et. al). Techniques for preparing glass bubbles typically include heating milled frit, commonly referred to as "feed", which contains a blowing agent (e.g., sulfur or a compound of oxygen and sulfur). The resultant product (that is, "raw product") obtained from the heating step typically contains a mixture of glass bubbles, broken glass bubbles, and solid glass beads, the solid glass beads generally resulting from milled frit particles that failed to form glass bubbles for whatever reason. The milled frit typically has range of particle sizes that influences the size distribution of the raw product. During heating, the larger particles tend to form glass bubbles that are more fragile than the mean, while the smaller particles tend to increase the density of the glass bubble distribution. When preparing glass bubbles by milling frit and heating the resulting particles, the amount of sulfur in the glass particles (i.e., feed) and the amount and length of heating to which the particles are exposed (e.g., the rate at which particles are fed through a flame) can typically be adjusted to adjust the density of the glass bubbles. Lower amounts of sulfur in the feed and faster heating rates lead to higher density bubbles as described in U.S. Pat. No. 4,391,646 (Howell) and U.S. Pat. No. 4,767,726 (Marshall). Furthermore, milling the frit to smaller sizes can lead to smaller, higher density glass bubbles.

Although the frit and/or the feed may have any composition that is capable of forming a glass, typically, on a total weight basis, the frit comprises from 50 to 90 percent of $SiO_2$, from 2 to 20 percent of alkali metal oxide, from 1 to 30 percent of $B_2O_3$, from 0.005-0.5 percent of sulfur (for example, as elemental sulfur, sulfate or sulfite), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$), from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. Additional ingredients are useful in frit compositions and can be included in the frit, for example, to contribute particular properties or characteristics (for example, hardness or color) to the resultant glass bubbles.

In some embodiments, the first plurality of glass bubbles according to the present disclosure has a glass composition comprising more alkaline earth metal oxide than alkali metal oxide. In some of these embodiments, the weight ratio of alkaline earth metal oxide to alkali metal oxide is in a range from 1.2:1 to 3:1. In some embodiments, the first plurality of glass bubbles according to the present disclosure has a glass composition comprising $B_2O_3$ in a range from 2 percent to 6 percent based on the total weight of the glass bubbles. In some embodiments, the glass bubbles have a glass composition comprising up to 5 percent by weight $Al_2O_3$, based on the total weight of the glass bubbles. In some embodiments, the glass composition is essentially free of $Al_2O_3$. "Essentially free of $Al_2O_3$" may mean up to 5, 4, 3, 2, 1, 0.75, 0.5, 0.25, or 0.1 percent by weight $Al_2O_3$. Glass compositions that are "essentially free of $Al_2O_3$" also include glass compositions having no $Al_2O_3$. Glass bubbles according to the present disclosure may have, in some embodiments, a chemical composition wherein at least 90%, 94%, or even at least 97% of the glass comprises at least 67% $SiO_2$, (e.g., a range of 70% to 80% $SiO_2$), a range of 8% to 15% of an alkaline earth metal oxide (e.g., CaO), a range of 3% to 8% of an alkali metal oxide (e.g., $Na_2O$), a range of 2% to 6% $B_2O_3$, and a range of 0.125% to 1.5% $SO_3$.

Glass bubbles useful for practicing the present disclosure (in some embodiments, the second plurality of glass bubbles) can be obtained commercially and include those prepared by spray-drying and marketed by Potters Industries, Valley Forge, Pa., (an affiliate of PQ Corporation) under the trade designations "SPHERICEL HOLLOW GLASS SPHERES" (e.g., grades 110P8 and 60P18) and glass bubbles marketed by 3M Company, St. Paul, Minn., under the trade designation "3M GLASS BUBBLES" (e.g., grades S60, S60HS, iM30K, S38HS, S38XHS, K42HS, K46, and H50/10000). In some embodiments, glass bubbles useful for practicing the present disclosure (e.g., the second plurality of glass bubbles) may be selected to have crush strengths of at least about 28, 34, 41, 48, or 55 MPa for 90% survival.

The first plurality of glass bubbles according to the present disclosure can be prepared, for example, by classifying a second plurality of glass bubbles, for example, having a size distribution comprising higher number of glass bubbles with a size of up to ten micrometers and, in some embodiments, a higher number of glass bubbles at least 40 micrometers in size than the first plurality of glass bubbles. Exemplary suitable apparatus for classifying the glass bubbles include vibrating screens (e.g., sieves), air classifiers, wet classifiers (e.g., wet scrubbing classifiers), fabric filter classifiers, settling classifiers, centrifugal classifiers, electrostatic classifiers, and combinations thereof. Exemplary suitable screens include sieves having a designation of from 200 mesh (74 micrometers) through at least 635 mesh (20 micrometers) according to ASTM Designation: E11-04 entitled "Standard Specification for Wire Cloth and Sieves for Testing Purposes". Such sieves may be obtained from commercial suppliers such as, for example, Newark Wire Cloth Company, Newark, N.J. Exemplary suitable air classifiers include gravitational classifiers, inertial classifiers, and centrifugal classifiers. Air classifiers are readily available from commercial sources, for example, as available from Hosokawa Micron Powder Systems under the trade designations "MICRON SEPARATOR", "ALPINE MODEL 100 MZR", "ALPINE TURBOPLEX ATP", "ALPINE STRATOPLEX ASP", or "ALPINE VENTOPLEX"; or from Sepor, Inc., Wilmington, Calif. under the trade designation "GAYCO CENTRIFUGAL SEPARATOR".

The classification method and apparatus may be selected so that the first plurality of glass bubbles is distributed from 1 to 45, 1 to 38, or 1 to 32 micrometers. In some embodiments of the methods disclosed herein, removing at least a portion of the second plurality of glass bubbles at least 40 micrometers in size comprises collecting glass bubbles that passed through a 32-micrometer screen. In some embodiments, removing at least a portion of the second plurality of glass bubbles up to ten micrometers in size comprises collecting glass bubbles that were retained on a 20-micrometer screen.

The second plurality of glass bubbles typically comprises a higher number of bubbles with a size of 10 (in some embodiments, 11, 12, 13, 14, or 15) micrometers and under than the first plurality of glass bubbles. For example the second plurality of glass bubbles may comprise at least 5, 10, 15, 20, 25, 30, 35, 40, 45, 50, 55, or 60 percent of bubbles with a size of up to 10, 11, 12, 13, 14, or 15 micrometers. In some embodiments, the second plurality of glass bubbles also has a size distribution with a higher number of glass bubbles at least 40 micrometers in size than the first plurality of glass bubbles. The second plurality of glass bubbles has a size distribution with a higher or lower median size by volume than the first plurality of glass bubbles. For example, the second plurality of glass bubbles can have a median size by volume in a range from 14 to 45 micrometers (in some embodiments from 15 to 40 micrometers, 20 to 45 micrometers, or 20 to 40 micrometers).

In some embodiments, the first plurality of glass bubbles is a graded fraction of the second plurality of glass bubbles of up to 75, 70, 65, 60, 55, 50, 45, 40, 35, 30, or 25 percent by weight of the second plurality of glass bubbles. In some embodiments, the first plurality of glass bubbles is a graded fraction of the second plurality of glass bubbles of at least 15, 20, 25, 30, or 35 percent by weight of the second plurality of glass bubbles. It may be desirable, for example, to choose a second plurality of glass bubbles with a high percentage of bubbles with a median size in a range from 15 to 40 micrometers.

The present disclosure provides composites comprising a polymer and a first plurality of glass bubbles according to and/or prepared according to the present disclosure. The polymer may be a thermoplastic or thermoset polymer, and the composite may contain a mixture of polymers. Suitable polymers for the composite may be selected by those skilled in the art, depending at least partially on the desired application.

In some embodiments, the polymer in the composite disclosed herein is a thermoplastic. Exemplary thermoplastics include polyolefins (e.g., polypropylene, polyethylene, and polyolefin copolymers such as ethylene-butene, ethylene-octene, and ethylene vinyl alcohol); fluorinated polyolefins (e.g., polytetrafluoroethylene, copolymers of tetrafluoroethylene and hexafloropropylene (FEP), perfluoroalkoxy polymer resin (PFA), polychlorotrifluoroethylene (pCTFE), copolymers of ethylene and chlorotrifluoroethylene (pECTFE), and copolymers of ethylene and tetrafluoroethylene (PETFE)); polyamide; polyamide-imide; polyetherimide; polyetherketone resins; polystyrenes; polystyrene copolymers (e.g., high impact polystyrene, acrylonitrile butadiene styrene copolymer (ABS)); polyacrylates; polymethacrylates; polyesters; polyvinylchloride (PVC); liquid crystal polymers (LCP); polyphenylene sulfides (PPS); polysulfones; polyacetals; polycarbonates; polyphenylene oxides; and blends of two or more such resins. In some embodiments, the polymer in the composite is a thermoplastic comprising at least one of polypropylene or polyethylene (e.g., high density polyethylene (HDPE), low density polyethylene (LDPE), linear low density polyethylene (LLDPE), polypropylene (PP)), and polyolefin copolymers (e.g., copolymers of propylene and ethylene). In some of these embodiments, the thermoplastic is polypropylene (e.g., high density polyethylene (HDPE), low density polyethylene (LDPE), and linear low density polyethylene (LLDPE)). In some embodiments, the thermoplastic is elastomeric.

In some embodiments, the polymer in the composite disclosed herein is a thermoset. Exemplary thermosets include epoxy, polyester, polyurethane, polyurea, silicone, polysulfide, and phenolic. In some embodiments, the polymer in the composite is a thermoset selected from the group consisting of epoxy, polyurethane, silicone, and polyester. In some embodiments, the thermoset is elastomeric.

In some embodiments, the polymer in the composite disclosed herein is elastomeric. Exemplary useful elastomeric polymers include polybutadiene, polyisobutylene, ethylene-propylene copolymers, ethylene-propylene-diene terpolymers, sulfonated ethylene-propylene-diene terpolymers, polychloroprene, poly(2,3-dimethylbutadiene), poly(butadiene-co-pentadiene), chlorosulfonated polyethylenes, polysulfide elastomers, silicone elastomers, poly(butadiene-co-nitrile), hydrogenated nitrile-butadiene copolymers, acrylic elastomers, ethylene-acrylate copolymers, fluorinated elastomers, fluorochlorinated elastomers, fluorobrominated elastomers and combinations thereof. The elastomeric polymer may be a thermoplastic elastomer. Exemplary useful thermoplastic elastomeric polymer resins include block copolymers, made up of blocks of glassy or crystalline blocks of, for example, polystyrene, poly(vinyltoluene), poly(t-butylstyrene), and polyester, and elastomeric blocks of, for example, polybutadiene, polyisoprene, ethylene-propylene copolymers, ethylene-butylene copolymers, polyether ester, and combinations thereof. Some thermoplastic elastomers are commercially available, for example, poly(styrene-butadiene-styrene) block copolymers marketed by Shell Chemical Company, Houston, Tex., under the trade designation "KRATON".

Other additives may be incorporated into the composite according to the present disclosure depending on the application (e.g., preservatives, curatives, mixing agents, colorants, dispersants, floating or anti-setting agents, flow or processing agents, wetting agents, air separation promoters, functional nanoparticles, and acid/base or water scavengers).

In some embodiments, the composites according to the present disclosure comprise an impact modifier (e.g., an elastomeric resin or elastomeric filler). Exemplary impact modifiers include polybutadiene, butadiene copolymers, polybutene, ground rubber, block copolymers, ethylene terpolymers, core-shell particles, and functionalized elastomers available, for example, from Dow Chemical Company, Midland, Mich., under the trade designation "AMPLIFY GR-216".

In some embodiments, composites disclosed herein may further comprise other density modifying additives like plastic bubbles (e.g., those available under the trade designation "EXPANCEL" from Akzo Nobel, Amsterdam, The Netherlands), blowing agents, or heavy fillers. In some embodiments, composites disclosed herein may further comprise at least one of glass fiber, wollastonite, talc, calcium carbonate, titanium dioxide (including nano-titanium dioxide), carbon black, wood flour, other natural fillers and fibers (e.g., walnut shells, hemp, and corn silks), silica (including nano-silica), and clay (including nano-clay).

In some embodiments of the composite according to the present disclosure, the glass bubbles may be treated with a coupling agent to enhance the interaction between the glass bubbles and the polymer. It is desirable to select a coupling agent that matches or provides suitable reactivity with corresponding functional groups of the chosen polymer formulation. Illustrative examples of coupling agents include zirconates, silanes, or titanates. Typical titanate and zirconate coupling agents are known to those skilled in the art and a detailed overview of the uses and selection criteria for these materials can be found in Monte, S. J., Kenrich Petrochemicals, Inc., "Ken-React® Reference Manual—Titanate, Zirconate and Aluminate Coupling Agents", Third Revised Edition, March, 1995. If used, coupling agents are commonly included in an amount of about 1 to 3% by weight, based on the total weight of the bubble.

Suitable silanes are coupled to glass surfaces through condensation reactions to form siloxane linkages with the siliceous filler. This treatment renders the filler more wet-able or promotes the adhesion of materials to the glass bubble surface. This provides a mechanism to bring about covalent, ionic or dipole bonding between inorganic fillers and organic matrices. Silane coupling agents are chosen based on the particular functionality desired. For example, an aminosilane glass treatment may be desirable for compounding with a polymer containing an anhydride, epoxy, amide or isocyanate group. Alternatively, silane treatments with acidic functionality may require polymer selections to possess blocks capable of acid-base interactions, ionic or hydrogen bonding scenarios. Another approach to achieving intimate glass bubble-polymer interactions is to functionalize the surface of microsphere with a suitable coupling agent that contains a polymerizable moiety, thus incorporating the material directly into the polymer backbone. Examples of polymerizable moieties are materials that contain olefinic functionality such as styrenic, acrylic and methacrylic moieties. Suitable silane coupling strategies are outlined in *Silane Coupling Agents Connecting Across Boundaries*, by Barry Arkles, pg 165-189, Gelest Catalog 3000-A Silanes and Silicones: Gelest Inc. Morrisville, Pa. Other illustrative examples of coupling agents include maleic anhydride-modified polypropylene and polyethylene.

In some embodiments, the first plurality of glass bubbles is present in the composite at a level of up to 60 volume percent without voids or up to 90 volume percent with voids, based on the total volume of the composite. In some embodiments, the first plurality of glass bubbles is present in the composite at a level of up to 55, 50, 45, 40, 35, or 30 percent by volume, based on the total volume of the composite. In some embodiments, the first plurality of glass bubbles is present in the composite at a level of up to 40, 35, 30, 25, 20, or 15 percent by weight, based on the total weight of the composite. For example, the first plurality of glass bubbles may be present in the composite in a range from 5 to 40, 5 to 35, 5 to 30, 5 to 25, 7.5 to 25, or 8 to 25 percent by weight, based on the total weight of the composite. The present disclosure can provide a cost-effective, low-density composite without compromising its physical properties. For example, the first plurality of glass bubbles according to the present disclosure has, in some embodiments, lower density and similar strength properties compared to commercially available glass bubbles. Hence, a desired composite density can be achieved when using a lower weight percent of the glass bubbles of the present disclosure while maintaining its physical properties. As a result, overall cost of the composite is reduced. Although glass bubbles have often been used to successfully reduce density of the final composites, such resultant composites have often exhibited undesirable loss of certain physical properties such as impact strength and tensile strength. A lower weight percentage of glass bubbles according to the present disclosure can be incorporated into composites, for example, because of their lower density, impacting the physical properties of the polymer to a lesser extent.

Generally, it is desirable that the glass bubbles be strong to avoid being crushed or broken during processing of a polymer composite, such as by high pressure spraying, kneading, extrusion, pultrusion, sintering, or molding (e.g., compression molding, injection molding, blow molding, roto-molding, thermoforming, and injection-compression molding). Typically, a first plurality of glass bubbles according to the present disclosure demonstrate improved survivability after processing compared to commercially available microspheres (e.g., the second plurality of glass bubbles from which the first plurality of glass bubbles is prepared). Thus, although the first plurality of glass bubbles according to the present disclosure may have a lower density than that of commercially available glass bubbles, they are surprisingly strong and able to survive high shear processes.

The survivability of the first plurality of glass bubbles according to the present disclosure can be seen, for example, in Tables 6 and 7 in the Examples, below. Ash densities were measured after extruding, injection molding, and compression molding composites prepared from a first plurality of glass bubbles according to the present disclosure and a comparative commercially available plurality of glass bubbles. As it may be seen from Table 6, ash density results for a composite made from the first plurality of glass bubbles according to the present disclosure had less of an increase after extrusion as compared to the as-produced commercial comparative examples from which the first plurality of glass bubbles is made; (see, Composite Example 1 vs. Comparative Composite Example A and Composite Example 2 vs. Comparative Composite Example B). An even more pronounced difference is seen after injection molding where the first plurality of glass bubbles according to the present disclosure has, in some cases, half the breakage of the current commercial material. Correspondingly the density of the composites is maintained at a lower specific density through the two processing techniques with the first plurality of glass bubbles according to the present disclosure.

Composites according to the present disclosure may be useful for making a variety of articles. Illustrative examples include those from the transportation industry such as instrumental panel cores, engine covers, side impact panels, interior trim, bumpers, fascia, o-rings, gaskets, brake pads, and hoses; molded household parts; composite sheets; thermoformed structural components; polymer wood composites, and wire and cable cladding. Other illustrative examples include potting compounds, panel structures, structural composite resins, plastic containers and pallets.

Selected Embodiments of the Disclosure

In a first embodiment, the present disclosure provides a first plurality of glass bubbles having an average true density of up to 0.55 grams per cubic centimeter and a size distribution comprising a median size by volume in a range from 15 micrometers to 40 micrometers, wherein a hydrostatic pressure at which ten percent by volume of the first plurality of glass bubbles collapses is at least 100 megapascals.

In a second embodiment, the present disclosure provides a first plurality of glass bubbles according to the first embodiment, wherein the median size by volume is in a range from 15 micrometers to 25 micrometers, and wherein the size distribution further comprises up to twenty percent by number of the glass bubbles having a size of up to ten micrometers.

In a third embodiment, the present disclosure provides a first plurality of glass bubbles according to the first embodiment, wherein the average true density is up to 0.45 grams per cubic centimeter, and wherein the median size by volume is in a range from 15 to 25 micrometers.

In a fourth embodiment, the present disclosure provides a first plurality of glass bubbles according to the first or third embodiment, wherein the size distribution further comprises up to forty percent by number of the glass bubbles having a size of up to ten micrometers.

In a fifth embodiment, the present disclosure provides a first plurality of glass bubbles according to any one of the first to fourth embodiments, wherein the glass bubbles have a glass composition comprising an alkaline earth metal oxide and an alkali metal oxide in a weight ratio in a range from 1.2:1 to 3:1.

In a sixth embodiment, the present disclosure provides a first plurality of glass bubbles according to any one of the first to fifth embodiments, wherein the glass bubbles have a glass composition comprising $B_2O_3$ in a range from 2 to 6 percent by weight, based on the total weight of the glass bubbles.

In a seventh embodiment, the present disclosure provides a first plurality of glass bubbles according to any one of the first to sixth embodiments, wherein the glass bubbles have a glass composition comprising up to 5 percent by weight $Al_2O_3$, based on the total weight of the glass bubbles.

In an eighth embodiment, the present disclosure provides a first plurality of glass bubbles according to any one of the first to seventh embodiments, wherein the glass bubbles have a glass composition comprising $SiO_2$ in a range from 70 to 80 percent by weight, alkaline earth metal oxide in a range from 8 to 15 percent by weight, and alkali metal oxide in a range from 3 to 8 percent by weight, each percent by weight based on the total weight of the glass bubbles.

In a ninth embodiment, the present disclosure provides a first plurality of glass bubbles according to any one of the first to eighth embodiments, wherein the first plurality of glass bubbles is a graded fraction preparable by classifying a second plurality of glass bubbles, wherein the second plurality of glass bubbles has a higher number of glass bubbles with a size of up to ten micrometers than the first plurality of glass bubbles.

In a tenth embodiment, the present disclosure provides a first plurality of glass bubbles according to the ninth embodiment, wherein the second plurality of glass bubbles has a higher number of glass bubbles at least 40 micrometers in size than the first plurality of glass bubbles.

In a eleventh embodiment, the present disclosure provides a first plurality of glass bubbles according to the ninth or tenth embodiment, wherein the graded fraction is obtainable by collecting glass bubbles that are distributed from 1 micrometer to 32 micrometers.

In a twelfth embodiment, the present disclosure provides a first plurality of glass bubbles according to any one of the ninth to eleventh embodiments, wherein classifying comprises at least one of screening, air classifying, fabric filter classifying, settling classifying, centrifugal classifying, electrostatic classifying, and wet scrubbing classifying.

In a thirteenth embodiment, the present disclosure provides a first plurality of glass bubbles according to any one of the first to twelfth embodiments, wherein the glass bubbles are treated with a coupling agent.

In a fourteenth embodiment, the present disclosure provides a composite comprising a polymer and a first plurality of glass bubbles according to any one of the first to thirteenth embodiments.

In a fifteenth embodiment, the present disclosure provides a composite according to the fourteenth embodiment, wherein the polymer comprises at least one of a thermoplastic polymer, a thermoset polymer, or an elastomer.

In a sixteenth embodiment, the present disclosure provides a composite according to the fourteenth embodiment, wherein the polymer is a thermoplastic polymer.

In a seventeenth embodiment, the present disclosure provides a composite according to the fourteenth embodiment, wherein the polymer is an elastomer.

In an eighteenth embodiment, the present disclosure provides a composite according to the fourteenth embodiment, wherein the polymer is a thermoset polymer.

In a nineteenth embodiment, the present disclosure provides a composite according to any one of the fourteenth to eighteenth embodiments, wherein the first plurality of glass bubbles is present in the composite at a level of up to 40 percent by weight, based on the total weight of the composite.

In a twentieth embodiment, the present disclosure provides a method of making a first plurality of glass bubbles according to any one of the first to eighth embodiments, the method comprising:

providing a second plurality of glass bubbles having a second size distribution comprising a median size by volume, a number of glass bubbles up to ten micrometers in size, and a number of glass bubbles at least 40 micrometers in size; and removing at least a portion of the glass bubbles up to ten micrometers in size, wherein after removing at least a portion of the glass bubbles up to ten micrometers in size, a first plurality of glass bubbles remains, and wherein the first plurality of glass bubbles has a number of glass bubbles up to ten micrometers in size that is lower than the number of glass bubbles up to ten micrometers in size of the second plurality of glass bubbles.

In a twenty-first embodiment, the present disclosure provides a method according to the twentieth embodiment, further comprising removing at least a portion of the glass bubbles at least 40 micrometers in size; wherein after removing at least a portion of the glass bubbles at least 40 micrometers in size and removing at least a portion of the glass bubbles up to ten micrometers in size, the first plurality of glass bubbles is obtained, wherein the first plurality of glass bubbles has a lower number of glass bubbles at least 40 micrometers in size than the second plurality of glass bubbles.

In a twenty-second embodiment, the present disclosure provides a method according to the twentieth or twenty-first embodiment, wherein the graded fraction is obtainable by collecting glass bubbles that are distributed from 1 micrometer to 32 micrometers.

In a twenty-third embodiment, the present disclosure provides a method according to any one of the twentieth to twenty-second embodiments, wherein classifying comprises at least one of screening, air classifying, fabric filter classifying, settling classifying, centrifugal classifying, electrostatic classifying, and wet scrubbing classifying.

In a twenty-fourth embodiment, the present disclosure provides a method of making a graded fraction of glass bubbles, the method comprising:

providing a second plurality of glass bubbles having a second size distribution comprising a median size by volume, a number of glass bubbles up to ten micrometers in size, and a number of glass bubbles at least 40 micrometers in size;

removing at least a portion of the glass bubbles at least 40 micrometers in size;

removing at least a portion of the glass bubbles up to ten micrometers in size, wherein after removing at least a portion of the glass bubbles at least 40 micrometers in size and removing at least a portion of the glass bubbles up to ten micrometers in size, a first plurality of glass bubbles remains, wherein the first plurality of glass bubbles has a number of glass bubbles up to ten micrometers in size that is lower than the number of glass bubbles up to ten micrometers in size of the second plurality of glass bubbles, and wherein one of the following conditions is met:

the first plurality of glass bubbles and the second plurality of glass bubbles have equivalent densities, but the first plurality of glass bubbles is higher in strength than the second plurality of glass bubbles;

the first plurality of glass bubbles and the second plurality of glass bubbles have equivalent strengths, but the first plurality of glass bubbles is lower in density than the second plurality of glass bubbles; or the first plurality of glass bubbles is both lower in density and higher in strength than the second plurality of glass bubbles.

In a twenty-fifth embodiment, the present disclosure provides a method according to the twenty-fourth embodiment, wherein the first plurality of particles has an average true density of up to 0.55 grams per cubic centimeter, and wherein the first plurality of particles has a median size by volume in a range from 15 micrometers to 40 micrometers.

In a twenty-sixth embodiment, the present disclosure provides a method according to the twenty-fifth embodiment, wherein the first plurality of particles has an average true density of up to 0.45 grams per cubic centimeter, and wherein the first plurality of particles has a median size by volume in a range from 15 micrometers to 25 micrometers.

In a twenty-seventh embodiment, the present disclosure provides a method according to any one of the twenty-fourth to twenty-sixth embodiments, wherein a hydrostatic pressure at which ten percent by volume of the first plurality of glass bubbles collapses is at least 100 megapascals.

In a twenty-eighth embodiment, the present disclosure provides a method according to any one of the twenty-fourth to twenty-seventh embodiments, wherein removing at least a portion of the glass bubbles at least 40 micrometers size comprises collecting glass bubbles that passed through a 32-micrometer screen.

In a twenty-ninth embodiment, the present disclosure provides a method according to any one of the twenty-fourth to twenty-eighth embodiments, wherein removing at least a portion of the glass bubbles up to ten micrometers in size comprises collecting glass bubbles that were retained on a 20-micrometer screen.

In a thirtieth embodiment, the present disclosure provides a method according to any one of the twenty-fourth to twenty-ninth embodiments, wherein the first plurality of particles has an average true density of up to 0.35 grams per cubic centimeter, and wherein a hydrostatic pressure at which ten percent by volume of the first plurality of glass bubbles collapses is at least 75 megapascals.

In order that this disclosure can be more fully understood, the following examples are set forth. It should be understood that these examples are for illustrative purposes only, and are not to be construed as limiting this disclosure in any manner

EXAMPLES

Materials:

Glass bubbles were obtained from 3M Company, St. Paul, Minn. under the trade designations "3M GLASS BUBBLES iM30K" and "3M GLASS BUBBLES K42HS". These glass bubbles have glass compositions comprising $SiO_2$ in a range from 70 to 80 percent by weight, alkaline earth metal oxide in a range from 8 to 15 percent by weight, and alkali metal oxide in a range from 3 to 8 percent by weight, and $B_2O_3$ in a range from 2 to 6 percent by weight, each percent by weight based on the total weight of the glass bubbles.

Polypropylene (PP) having a density of 0.9 g/cm³ was obtained from LyondellBasell Polymers, North America, under the trade designation "PRO-FAX 6523".

An impact modifier comprising a maleic anhydride grafted (MAH) polymer was obtained from Dow Chemical Company, Midland, Mich. under the trade designation "AMPLIFY GR 216". The density of the impact modifier was 0.87 g/cm³, and the melt index (190° C./2.16 kg) was 1.3 g/10 min.

Polyamide 6,6, (nylon) having a density of 1.14 g/cm³ was obtained from DuPont, Wilmington, Del., under the trade designation "ZYTEL 101".

Test Methods:

Average Particle Density Determination: A fully automated gas displacement pycnometer obtained under the trade designation "ACCUPYC 1330 PYCNOMETER" from Micromeritics, Norcross, Ga., was used to determine the density of microspheres according to ASTM D2840-69, "Average True Particle Density of Hollow Microspheres".

Particle Size Determination by Laser Light Diffraction: Particle size on a volume percent distribution was determined by laser light diffraction using a particle size analyzer available under the trade designation "SATURN DIGISIZER" from Micromeritics. Glass bubbles were dispersed in deaerated deionized water prior to particle size determination.

Particle Size Determination by SEM Analysis: Particle size distribution was also measured in some Examples using Scanning Electron Microscope (SEM) image analysis wherein the diameter of each hollow microsphere was measured using a software (Olympus "measurIT" software) provided with the microscope (model "Phenom™ Scanning Electron Microscope" obtained from FEI Company, Hillsboro, Oreg.). The glass bubble size data was then sorted and analyzed to calculate particle percent distribution (i.e., actual number of particles of a certain diameter, as a percent of all particles measured).

Strength Test: The strength of the glass bubbles was measured using ASTM D3102-72 "Hydrostatic Collapse Strength of Hollow Glass Microspheres"; with the following modifications. The sample size (in grams) was equal to 10 times the density of the glass bubbles. The microspheres were dispersed in glycerol (20.6 g), and data reduction was automated using computer software. The value reported is the hydrostatic pressure at which 10 and 20 percent by volume of the glass bubbles collapse (Strength at 90% and 80% survival, respectively).

Notched Izod Impact resistance: Izod impact resistance of the composites was measured according to the procedure outlined in ASTM D256 "Standard Test Methods for Determining the Izod Pendulum Impact Resistance of Plastics".

Compression Molding: Pellets of composites were compression molded at 4 different hold pressures to simulate a targeted process of injection-compression molding with different compression pressures. A compression plate comprising a ⅛ inch (in.) (0.32 cm) thick 11 in. by 11 in. (27.94 cm by 27.94 cm) picture frame mold was used. The frame was wrapped with sturdy aluminum foil and further comprised two 1/16 in. (0.16 cm) thick plates of steel disposed on the top and bottom portions of the aluminum-wrapped frame. A weighed pile of pellets was placed in the center of compression plate and placed in a 12 in. by 12 in. (30.48 cm) heated platen compression molder (model 25-12H from Carver Inc., Wabash Ind.). The temperature was set at 210° C. The platens were compressed to the desired pressure slowly to allow the melting polymer to flow evenly out into the compression plate. Simulated pressures were 10,000 PSI (69 MPa), 15,000 PSI (103 MPa), 20,000 PSI (138 MPa) and 25,000 PSI (172 MPa). After compression for 5 minutes at the desired temperature, the platens were released and the sandwich was put on a lab bench, in air, to cool. The steel and aluminum foil layers were peeled from either side of the compression plate and the formed compression plaque was cut out of the picture frame with an exacto knife.

Ash density: Composite samples containing glass bubbles were placed in a kiln (model 300/14 obtained from Nabertherm, Lilienthal, Germany) The temperature was increased according to the following procedure: 1 hour at 200° C., 1 hour at 250° C., 1 hour at 300° C., 1 hour at 350° C., 2 hours at 450° C. and 12 hours at 600° C. Samples were then removed from the kiln and allowed to cool down to room temperature. The resulting ash was measured by the above-described pycnometer density method.

Flexural Strength and Modulus: Composite samples were mounted on a tensile strength testing equipment (Sintech 1G model 5401029 obtained from MTS, Eden Prairie, Minn.). Flexural properties were measured following the procedure outlined in ASTM D790-10 "Standard Test Methods for Flexural Properties of Unreinforced and Reinforced Plastics and Electrical Insulating Materials", using a strain rate of 0.2 in/min (0.51 cm/min)

Tensile strength and elongation at break and yield: Composite samples were mounted on the tensile strength testing equipment. Tensile and elongation were measured following the procedure outlined in ASTM D638 "Standard Test Method for Tensile Properties of Plastics", using a separation speed of 3 in/min (7.62 cm/min).

Melt flow rate (MFR): Composite pellets were placed into a melt indexer (model MP600 obtained from Tinius Olsen, Horsham, Pa.) and allowed to equilibrate at 230° C. for 7 minutes. The pellets were then tested following the procedure outlined in ASTM D1238-10 "Standard Test Method for Melt Flow Rates of Thermoplastics by Extrusion Plastometer" for polypropylene (230° C. and 2.16 kg) and nylon (236° C. and 5 kg).

Glass Bubbles Example 1

A weighed amount (261 grams) of "3M GLASS BUBBLES iM30K" glass bubbles was put onto the top of a stack of sieves comprising USA Standard Testing Sieves in descending mesh opening sizes from top to bottom. The following sieves were used: 200 mesh (74 μm), 230 mesh (63 μm), 270 mesh (53 μm), 325 mesh (44 μm), and 400 mesh (37 μm). The stack of sieves was then put into a Tyler vibratory sieve shaker for about 15 minutes. After the screening process, the material that remained on top of each sieve (i.e., "overs") was collected and weighed. Glass bubbles that passed through all of the sieves used in the stack (38 micron sieve "unders") were sieved again but this time using an air jet sieve with vacuum (model "Alpine Augsburg Jet Sieve" obtained from Hosokawa Alpine, Augsburg, Germany). Only one sieve was used at a time for the jet sieve. The glass bubbles were first run through the 32 micron (450 mesh) jet sieve. The "overs" were collected and weighed. The bubbles that passed through the 450 mesh sieve were then sieved through a 20 micron (635 mesh) sieve on the jet sieve. A small amount of material was run through each sieve on the jet sieve to prevent "blinding", which occurs when the oversized particles plug the screen of the sieve preventing the smaller particle sizes from passing through. The jet sieves were blown clean with air between sieve cycles. The "overs" for the 20 micron sieve were collected and weighed and are designated Glass Bubbles Example 1. Particle size distribution was measured for Glass Bubbles Example 1 using laser light diffraction as described above, and is reported in Table 1, below. Glass Bubbles Example 1 had an average true density of 0.5259 g/cm³, and the hydrostatic pressure at which ten percent by volume of Glass Bubbles Example 1 collapsed was higher than 30,000 PSI (206.8 MPa).

Comparative Glass Bubbles Example A

The "overs" for the 38 micron sieve described in Glass Bubbles Example 1 were collected and designated Comparative Glass Bubbles Example A, which had an average true density of 0.5779 g/cm³ and strength at 90% of about 10,213 PSI (70.4 MPa).

Glass Bubbles Example 2

Glass Bubbles Example 2 was prepared according to the method of Glass Bubbles Example 1 except starting with "3M GLASS BUBBLES K42HS" glass bubbles. Particle size distribution was measured for Glass Bubbles Example 2 using laser light diffraction as described above, and is reported in Table 1, below. Glass Bubbles Example 2 had an average true density of 0.42 g/cm³, and the hydrostatic pressure at which ten percent by volume of Glass Bubbles Example 2 collapsed was 16,000 PSI (110 MPa).

Glass Bubbles Example 3

The "overs" for the 32 micron sieve described in Glass Bubbles Example 2 were collected and designated Glass Bubbles Example 3, which had an average true density of 0.3370 g/cm³ and strength at 90% of about 11,453 PSI (78.9 MPa).

Particle size distribution was measured for Glass Bubbles Examples 1 to 3 and Comparative Glass Bubbles Example A using laser light diffraction as described above, and is reported in Table 1, below.

TABLE 1

Particle size distribution

| Example | D90 | D50 | D10 |
|---|---|---|---|
| Glass Bubbles Example 1 | 27.2 | 17 | 0.37 |
| Glass Bubbles Example 2 | 31.7 | 20.9 | 8.8 |
| Comparative Glass Bubbles Ex. A | 46.3 | 17 | 6.7 |
| Glass Bubbles Example 3 | 39.1 | 30.1 | 0.21 |

Particle size distribution was also measured for Glass Bubbles Examples 1 and 2 and starting materials "3M GLASS BUBBBLES iM30K" and "3M GLASS BUBBLES K42HS" using the SEM image analysis method described above. The total number of particles (expressed in number % particles) below each whole number diameter between 1 and 45 is shown in Table 2, below.

TABLE 2

Particle size distribution using SEM image analysis method.

| Particle diameter (μm) | % particles "3M GLASS BUBBLES iM30K" | "3M GLASS BUBBLES K42HS" | Glass Bubbles Example 1 | Glass Bubbles Example 2 |
|---|---|---|---|---|
| 1 | 0.00 | 0.00 | 0.00 | 0.00 |
| 2 | 0.00 | 1.59 | 0.00 | 0.50 |
| 3 | 0.00 | 4.78 | 0.00 | 0.99 |
| 4 | 1.28 | 9.96 | 0.00 | 1.49 |
| 5 | 6.41 | 15.54 | 0.00 | 5.45 |
| 6 | 7.69 | 27.89 | 0.00 | 8.42 |
| 7 | 10.26 | 37.85 | 0.00 | 10.40 |
| 8 | 10.26 | 51.00 | 4.35 | 14.85 |
| 9 | 14.10 | 59.36 | 5.80 | 23.76 |
| 10 | 15.38 | 64.54 | 11.59 | 30.20 |
| 11 | 20.51 | 68.53 | 15.94 | 42.08 |
| 12 | 24.36 | 74.10 | 17.39 | 51.98 |
| 13 | 32.05 | 77.69 | 20.29 | 56.93 |
| 14 | 34.62 | 79.68 | 24.64 | 64.36 |
| 15 | 39.74 | 81.67 | 27.54 | 68.32 |
| 16 | 44.87 | 83.67 | 28.99 | 74.26 |
| 17 | 48.72 | 84.86 | 33.33 | 79.21 |
| 18 | 56.41 | 86.85 | 39.13 | 82.67 |
| 19 | 58.97 | 86.85 | 46.38 | 83.66 |
| 20 | 61.54 | 87.65 | 52.17 | 85.64 |
| 21 | 66.67 | 88.05 | 56.52 | 87.62 |
| 22 | 66.67 | 90.04 | 62.32 | 89.11 |
| 23 | 67.95 | 90.44 | 68.12 | 92.08 |
| 24 | 70.51 | 91.24 | 69.57 | 94.55 |
| 25 | 73.08 | 92.83 | 73.91 | 95.54 |
| 26 | 73.08 | 94.02 | 73.91 | 96.53 |
| 27 | 75.64 | 94.42 | 76.81 | 96.53 |
| 28 | 76.92 | 96.02 | 78.26 | 97.03 |
| 29 | 78.21 | 96.81 | 84.06 | 97.52 |
| 30 | 83.33 | 97.61 | 89.86 | 97.52 |
| 31 | 84.62 | 97.61 | 98.55 | 98.02 |
| 32 | 85.90 | 98.01 | 100.00 | 98.51 |
| 33 | 87.18 | 98.01 | — | 98.51 |
| 34 | 89.74 | 98.01 | — | 99.01 |
| 35 | 91.03 | 98.01 | — | 99.50 |
| 36 | 92.31 | 98.01 | — | 99.50 |
| 37 | 92.31 | 99.20 | — | 100.00 |
| 38 | 93.59 | 99.20 | — | — |
| 39 | 96.15 | 99.20 | — | — |
| 40 | 96.15 | 99.20 | — | — |
| 41 | 97.44 | 99.20 | — | — |
| 42 | 98.72 | 99.20 | — | — |
| 43 | 100.00 | 99.60 | — | — |
| 44 | — | 99.60 | — | — |
| 45 | — | 100.00 | — | — |

Average density and strength at 90% survival of "3M GLASS BUBBLES iM30K" and "3M GLASS BUBBLES K42HS" glass bubbles, Glass Bubbles Examples 1 to 3, and Comparative Glass Bubbles Example A were measured and are shown in Table 3, below.

TABLE 3

Average density and strength at 90%.

| Examples | Average density (g/cm³) | Strength at 90% PSI (MPa) |
|---|---|---|
| "3M GLASS BUBBLES iM30K" | 0.601 | 30,000 (207) |
| "3M GLASS BUBBLES K42HS" | 0.420 | 11,500 (79) |
| Glass Bubbles Ex. 1 | 0.526 | 28,950 (200) |
| Glass Bubbles Ex. 2 | 0.420 | 16,800 (116) |
| Comp. Glass Bubbles Ex. A | 0.578 | 10,200 (70) |
| Glass Bubbles Ex. 3 | 0.337 | 11,460 (79) |

Control Example 1

Pellets of PP were fed into a 24-mm twin screw extruder (model "Prism" obtained from Thermo Fisher Scientific, Waltham, Mass.) equipped with a side stuffer and heated to 200° C. The extruder speed was set at 200 rpm. Test bodies of the extruded PP were prepared using an injection molding machine (model Boy 22D obtained from Boy Limited, Northants, UK) and an ASTM test specimen mold. The injection molder barrel was heated to 220° C. and the mold was held at 50° C. PP was injected into the mold at conditions that maximized the molding pressure. At the highest pressures, the injection pressure was 3,200 PSI (22 MPa). The injection molding machine had an intensification ratio of 6.6 so the ultimate pressure felt by the composites was approximately 21,200 PSI (146 MPa).

Comparative Composite Example A

A composite of "3M GLASS BUBBLES iM30K" glass bubbles and PP with a desired target density of 0.813 g/cm$^3$ was prepared. Pellets of PP and the glass bubbles were fed into the twin screw extruder heated to 200° C. on a 78.5/21.5 percent by weight ratio. Test bodies of Comparative Composite Example A were prepared as described above in Control Example 1.

Comparative Composite Example B

A composite of "3M GLASS BUBBLES K42HS" glass bubbles and PP with a desired target density of 0.816 g/cm$^3$ was prepared as described in Comparative Composite Example A. The PP/glass bubbles weight ratio was about 91/9. Test bodies of Comparative Composite Example B were prepared as described above in Control Example 1.

Composite Example 1

A composite of Glass Bubbles Example 1 and PP with a desired target density of 0.813 g/cm$^3$ was prepared as described in Comparative Composite Example A. The PP/glass bubbles weight ratio was about 85/15. Pellets of the composite were injection molded in a Boy 22D injection molder using an ASTM test specimen mold at a temperature of 50° C. and an injection pressure of 3,200 PSI (22 MPa). Test bodies of Composite Example 1 were prepared as described in Control Example 1.

Composite Example 2

A composite of Glass Bubbles Example 2 and PP with a desired target density of 0.816 g/cm$^3$ was prepared as described in Comparative Composite Example B. The PP/glass bubbles weight ratio was about 91/9. Test bodies of Composite Example 2 were prepared as described in Control Example 1.

Control Example 2

Pellets of PP and impact modifier (IM) "AMPLIFY GR 216" were fed into the twin screw extruder on a 90/10 percent by weight ratio to produce an impact modified polypropylene (Control Example 2) having a target density of 0.897 g/cm$^3$. Test bodies of Control Example 2 were prepared as described in Control Example 1.

Comparative Composite Example C

Comparative Composite Example C was prepared as described in Control Example 2, except that "3M GLASS BUBBLES iM30K" glass bubbles were also fed into the twin screw extruder to produce a composite having a target density of 0.812 g/cm$^3$. The ratio of PP/IM/glass bubbles was 68.5/10/21.5 percent by weight. Test bodies of Comparative Composite Example C were prepared as described in Control Example 1.

Comparative Composite Example D

Comparative Composite Example D was prepared as described in Control Example 2, except that "3M GLASS BUBBLES K42HS" glass bubbles were also fed into the twin screw extruder to produce a composite having a target density of 0.814 g/cm$^3$. The ratio of PP/IM/glass bubbles was 81/10/9 percent by weight. Test bodies of Comparative Composite Example D were prepared as described in Control Example 1.

Composite Example 3

An impact-modified composite was prepared as described in Control Example 2, except that Glass Bubbles Example 1 were also fed into the twin screw extruder to produce a composite having a target density of 0.811 g/cm$^3$. The ratio of PP/IM/glass bubbles was 75/10/15 percent by weight. Test bodies of Composite Example 3 were prepared as described in Control Example 1.

Composite Example 4

An impact-modified composite was prepared as described in Control Example 2, except that Glass Bubbles Example 2 were also fed into the twin screw extruder to produce a composite having a target density of 0.814 g/cm$^3$. The ratio of PP/IM/glass bubbles was 81/10/9 percent by weight. Test bodies of Composite Example 4 were prepared as described in Control Example 1.

Control Example 3

Pellets of nylon were fed into the twin screw extruder as described in Control Example 1 to produce an polyamide composite (Control Example 3) having a density of 1.14 g/cm$^3$. Test bodies of Control Example 3 were prepared as described in Control Example 1, except that the injection molder barrel was heated to 270° C.

Comparative Composite Example E

Comparative Composite Example E was prepared as described in Control Example 3, except that "3M GLASS BUBBLES iM30K" glass bubbles were also fed into the twin screw extruder to produce a composite having a target density of 0.970 g/cm$^3$. The ratio of nylon/glass bubbles was 80.54/19.46 percent by weight. Test bodies of Comparative Composite Example E were prepared as described in Control Example 1.

Comparative Composite Example F

Comparative Composite Example F was prepared as described in Control Example 3, except that "3M GLASS BUBBLES K42HS" glass bubbles were also fed into the twin screw extruder to produce a composite having a target density of 0.985 g/cm³. The ratio of nylon/glass bubbles was 90.85/9.15 percent by weight. Test bodies of Comparative Composite Example F were prepared as described in Control Example 1.

Composite Example 5

A composite of Glass Bubbles Example 1 and nylon with a desired target density of 0.940 g/cm³ was prepared as described in Comparative Composite Example A, except that Nylon was used. The nylon/glass bubbles weight ratio was about 85/15. Test bodies of Composite Example 5 were prepared as described in Control Example 1.

Composite Example 6

A composite of Glass Bubbles Example 2 and nylon with a desired target density of 0.986 g/cm³ was prepared as described in Comparative Composite Example A, except that Nylon was used. The nylon/glass bubbles weight ratio was about 90/10. Test bodies of Composite Example 6 were prepared as described in Control Example 1.

A summary of Control Examples 1, 2 and 3, and the composites prepared as described in Comparative Composite Examples A-F and Composite Examples 1-6 is shown in Table 4, below.

Impact resistance (impact), flexural modulus (flex modulus), tensile strength (tensile), and melt flow rate (MFR) for test bodies prepared as described in Control Examples 1 and 2, Comparative Composite Examples A-F, and Composite Examples 1-6 were measured as described above and are reported in Table 5, below. All results are reported as an average of 5 tests for each Example.

TABLE 4

Composites

| Examples | Glass bubbles | Impact modifier (IM) | PP/microspheres/IM weight ratio | Composite Target Density (g/cm³) |
|---|---|---|---|---|
| Control Example 1 | None | None | 100 | 0.9 |
| Comp. Composite Ex. A | "3M GLASS BUBBLES iM30K" | None | 78.5/21.5 | 0.813 |
| Comp. Composite Ex. B | "3M GLASS BUBBLES K42HS" | None | 91/9 | 0.816 |
| Composite Example 1 | Glass Bubbles Ex. 1 | None | 85/15 | 0.813 |
| Composite Example 2 | Glass Bubbles Ex. 2 | None | 91/9 | 0.816 |
| Control Example 2 | None | Amplify GR 216 | 90/0/10 | 0.897 |
| Comp. Composite Example C | "3M GLASS BUBBLES iM30K" | Amplify GR 216 | 68.5/21.5/10 | 0.811 |
| Comp. Composite Ex. D | "3M GLASS BUBBLES K42HS" | Amplify GR 216 | 81/9/10 | 0.814 |
| Composite Example 3 | Glass Bubbles Ex. 1 | Amplify GR 216 | 75/15/10 | 0.811 |
| Composite Example 4 | Glass Bubbles Ex. 2 | Amplify GR 216 | 81/10/9 | 0.814 |
| Control Example 3 | None | None | 100 | 1.14 |
| Comp. Composite Ex. E | "3M GLASS BUBBLES iM30K" | None | 80.54/19.46 | 0.970 |
| Comp. Composite Ex. F | "3M GLASS BUBBLES K42HS" | None | 90.85/9.15 | 0.985 |
| Composite Example 5 | Glass Bubbles Ex. 1 | None | 85/15 | 0.970 |
| Composite Example 6 | Glass Bubbles Ex. 2 | None | 90/10 | 0.986 |

TABLE 5

Impact resistance, flexural modulus, tensile strength and melt flow rate.

| Examples | Impact Resistance (J/m²) | Flex Modulus (MPa) [kpsi] | Tensile Strength (MPa) [kpsi] | MFR (g/10 min) |
|---|---|---|---|---|
| Control Example 1 | 2952 | 597.91 [86.72] | 30.34 [4.4] | 4.774 |
| Comp. Composite Ex. A | 1405 | 982.50 [142.5] | 17.24 [2.5] | 2.141 |
| Comp. Composite Ex. B | 1603 | 700.78 [101.64] | 22.75 [3.3] | 2.968 |
| Composite Example 1 | 1491 | 775.93 [112.54] | 19.99 [2.9] | 2.522 |
| Composite Example 2 | 1681 | 787.24 [114.18] | 22.06 [3.2] | 2.943 |
| Control Example 2 | 7686 | 564.96 [81.94] | 26.20 [3.8] | 4.559 |
| Comp. Composite Ex. C | 2810 | 648.93 [94.12] | 20.68 [3.0] | 1.505 |
| Comp. Composite Ex. D | 2998 | 602.33 [87.36] | 22.75 [3.3] | 2.688 |
| Composite Example 3 | 2898 | 591.43 [85.78] | 21.37 [3.1] | 2.234 |
| Composite Example 4 | 3168 | 671.55 [97.4] | 22.75 [3.3] | 2.563 |
| Control Example 3 | 4288 | 3939.66 [271.4] | 67.71 [9.82] | 47.0 |

TABLE 5-continued

Impact resistance, flexural modulus, tensile strength and melt flow rate.

| Examples | Impact Resistance (J/m$^2$) | Flex Modulus (MPa) [kpsi] | Tensile Strength (MPa) [kpsi] | MFR (g/10 min) |
|---|---|---|---|---|
| Comp. Composite Ex. E | 1793 | 2602.77 [377.5] | 55.16 [8.0] | 19.2 |
| Comp. Composite Ex. F | 1976 | 2129.10 [308.8] | 65.50 [9.5] | 27.3 |
| Composite Example 5 | 1924 | 2441.43 [354.1] | 59.29 [8.6] | 21.1 |
| Composite Example 6 | 1937 | 2155.99 [312.7] | 64.81 [9.4] | 26.7 |

Ash density for microspheres (neat), pellets (after extrusion), and injection molded plaques prepared as described in Comparative Composite Examples A-F and Composite Examples 1-6 was measured. The difference between the initial density (measured for microspheres) and the final density (measured for pellets and/or plaques) was calculated and is expressed as % density increase. Initial density (g/cm$^3$), ash density (g/cm$^3$), and density increase (%) are reported in Table 6, below.

TABLE 6

Density, ash density and density increase with injection molded plaques.

| | Glass | Extruded Pellets | | Injected Plaques | |
|---|---|---|---|---|---|
| Examples | Bubbles Density (g/cm$^3$) | Ash density (g/cm$^3$) | Density increase (%) | Ash density (g/cm$^3$) | Density increase (%) |
| Comp. Composite Ex. A | 0.601 | 0.674 | 12.07 | 0.685 | 13.97 |
| Comp. Composite Ex. B | 0.422 | 0.551 | 30.53 | 0.651 | 54.28 |
| Composite Example 1 | 0.526 | 0.596 | 9.16 | 0.605 | 10.77 |
| Composite Example 2 | 0.420 | 0.515 | 22.67 | 0.527 | 25.50 |
| Comp. Composite Ex. C | 0.601 | 0.658 | 9.39 | 0.662 | 10.11 |
| Comp. Composite Ex. D | 0.422 | 0.519 | 23.11 | 0.641 | 51.96 |
| Composite Example 3 | 0.526 | 0.584 | 6.94 | 0.600 | 9.86 |
| Composite Example 4 | 0.420 | 0.493 | 17.36 | 0.527 | 25.40 |
| Comp. Composite Ex. E | 0.601 | 0.666 | 6.48 | 0.678 | 7.67 |
| Comp. Composite Ex. F | 0.422 | 0.524 | 10.18 | 0.603 | 18.06 |
| Composite Example 5 | 0.526 | 0.589 | 6.34 | 0.592 | 6.58 |
| Composite Example 6 | 0.42 | 0.495 | 7.5 | 0.544 | 12.35 |

Pellets of the composites were subjected to 4 different compression pressures, as described above. Ash density was measured for the compression plaques and is reported in Table 7, below.

TABLE 7

Ash density measured after compression molding.

| | Ash density of Compression Plaques (g/cm$^3$) | | | |
|---|---|---|---|---|
| Examples | 10,000 PSI (69 MPa) | 15,000 PSI (103 MPa) | 20,000 PSI (138 MPa) | 25,000 PSI (172 MPa) |
| Comp. Composite Example A | 0.682 | 0.699 | 0.714 | 0.735 |
| Comp. Composite Example B | 0.601 | 0.679 | 0.787 | 0.854 |
| Composite Example 1 | 0.596 | 0.597 | 0.601 | 0.623 |
| Composite Example 2 | 0.517 | 0.518 | 0.533 | 0.601 |

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein. All patents and patent applications cited above are hereby incorporated by reference into this document in their entirety.

What is claimed is:

1. A first plurality of glass bubbles having an average true density of up to about 0.5 grams per cubic centimeter and a size distribution comprising a median size by volume in a range from about 15 micrometers to about 40 micrometers, wherein a hydrostatic pressure at which ten percent by volume of the first plurality of glass bubbles collapses is at least about 100 megapascals.

2. A first plurality of glass bubbles having an average true density of up to about 0.55 grams per cubic centimeter and a size distribution comprising a median size by volume in a range from about 15 micrometers to about 25 micrometers, wherein a hydrostatic pressure at which ten percent by volume of the first plurality of glass bubbles collapses is at least about 100 megapascals, and wherein the size distribution further comprises up to twenty percent by number of the glass bubbles having a size of up to ten micrometers.

3. A first plurality of glass bubbles according to claim 1, wherein the average true density is up to about 0.45 grams per cubic centimeter, and wherein the median size is in a range from about 15 micrometers to about 25 micrometers.

4. A first plurality of glass bubbles according to claim 1, wherein the size distribution further comprises up to forty percent by number of the glass bubbles having a size of up to ten micrometers.

5. A first plurality of glass bubbles according to claim 1, wherein the glass bubbles have a glass composition comprising an alkaline earth metal oxide and an alkali metal oxide in a weight ratio in a range from 1.2:1 to 3:1.

6. A first plurality of glass bubbles according to claim 1, wherein the glass bubbles have a glass composition comprising $B_2O_3$ in a range from 2 to 6 percent by weight, based on the total weight of the glass bubbles.

7. A first plurality of glass bubbles according to claim 1, wherein the glass bubbles have a glass composition comprising up to 5 percent by weight $Al_2O_3$, based on the total weight of the glass bubbles.

8. A first plurality of glass bubbles according to claim 1, wherein the glass bubbles have a glass composition comprising $SiO_2$ in a range from 70 to 80 percent by weight, alkaline earth metal oxide in a range from 8 to 15 percent by weight, and alkali metal oxide in a range from 3 to 8 percent by weight, each percent by weight based on the total weight of the glass bubbles.

9. A first plurality of glass bubbles according to claim 1, wherein the first plurality of glass bubbles is a graded fraction preparable by classifying a second plurality of glass bubbles, wherein the second plurality of glass bubbles has a higher percentage of glass bubbles with a size of up to ten micrometers than the first plurality of glass bubbles.

10. A first plurality of glass bubbles according to claim 9, wherein the second plurality of glass bubbles a higher median size than the first plurality of glass bubbles.

11. A first plurality of glass bubbles according to claim 9, wherein the graded fraction is obtainable by collecting glass bubbles that are distributed from 1 micrometer to 32 micrometers.

12. A composite comprising a polymer and a first plurality of glass bubbles according to claim 1.

13. The composite according to claim 12, wherein the first plurality of glass bubbles is present in the composite at a level of up to 40 percent by weight, based on the total weight of the composite.

14. A method of making a first plurality of glass bubbles according to claim 1, the method comprising:
 providing a second plurality of glass bubbles having a second size distribution comprising a median size by volume, a number of glass bubbles up to ten micrometers in size, and a number of glass bubbles at least 40 micrometers in size; and
 removing at least a portion of the glass bubbles up to ten micrometers in size,
 wherein after removing at least a portion of the glass bubbles up to ten micrometers in size, a first plurality of glass bubbles remains, and wherein the first plurality of glass bubbles has a number of glass bubbles up to ten micrometers in size that is lower than the number of glass bubbles up to ten micrometers in size of the second plurality of glass bubbles.

15. The method according to claim 14, further comprising removing at least a portion of the glass bubbles at least 40 micrometers in size.

16. A first plurality of glass bubbles according to claim 9, wherein classifying comprises at least one of screening, air classifying, fabric filter classifying, settling classifying, centrifugal classifying, electrostatic classifying, and wet scrubbing classifying.

17. A first plurality of glass bubbles according to claim 1, wherein the glass bubbles are treated with a coupling agent.

18. A composite comprising a polymer and a first plurality of glass bubbles according to claim 2.

19. A first plurality of glass bubbles according to claim 1, wherein the average true density is up to about 0.53 grams per cubic centimeter.

20. A first plurality of glass bubbles having an average true density of up to about 0.55 grams per cubic centimeter and a size distribution comprising a median size by volume in a range from about 15 micrometers to about 25 micrometers, wherein a hydrostatic pressure at which ten percent by volume of the first plurality of glass bubbles collapses is at least about 100 megapascals.

\* \* \* \* \*

UNITED STATES PATENT AND TRADEMARK OFFICE
CERTIFICATE OF CORRECTION

Page 1 of 1

PATENT NO. : 9,006,302 B2
APPLICATION NO. : 13/821167
DATED : April 14, 2015
INVENTOR(S) : Amos et al.

It is certified that error appears in the above-identified patent and that said Letters Patent is hereby corrected as shown below:

In the Specification

<u>Column 8</u>
Line 48, delete "hexafloropropylene" and insert -- hexafluoropropylene --, therefor.

<u>Column 10</u>
Line 30, delete "Agents" and insert -- Agents; --, therefor.

<u>Column 14</u>
Line 56, delete "manner" and insert -- manner. --, therefor.

<u>Column 16</u>
Line 8, delete "exacto" and insert -- xacto --, therefor.
Line 25, delete "(0.51 cm/min)" and insert -- (0.51 cm/min). --, therefor.

<u>Column 17</u>
Line 63, delete "BUBBBLES" and insert -- BUBBLES --, therefor.

In the Claims

<u>Column 24</u>
Line 23, in Claim 1, delete "0.5" and insert -- 0.54 --, therefor.

Signed and Sealed this
Seventeenth Day of March, 2020

Andrei Iancu
*Director of the United States Patent and Trademark Office*